July 11, 1967                J. S. STEVENSON                3,330,160
                      MIXTURE DENSITY CONTROL APPARATUS
Filed Oct. 30, 1964                                    2 Sheets-Sheet 2
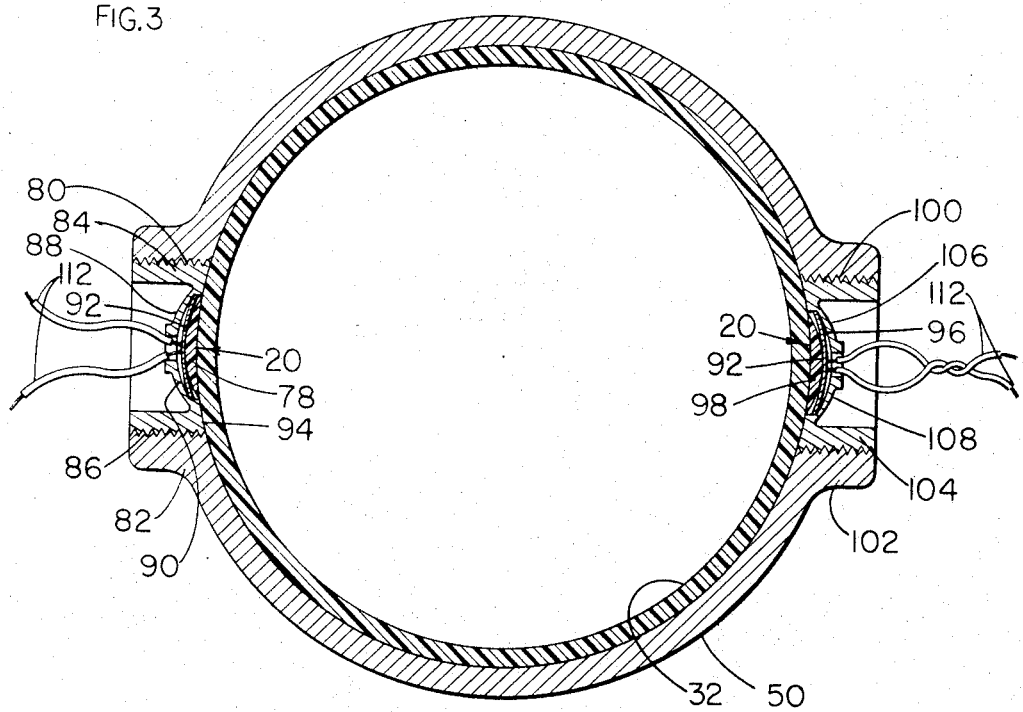
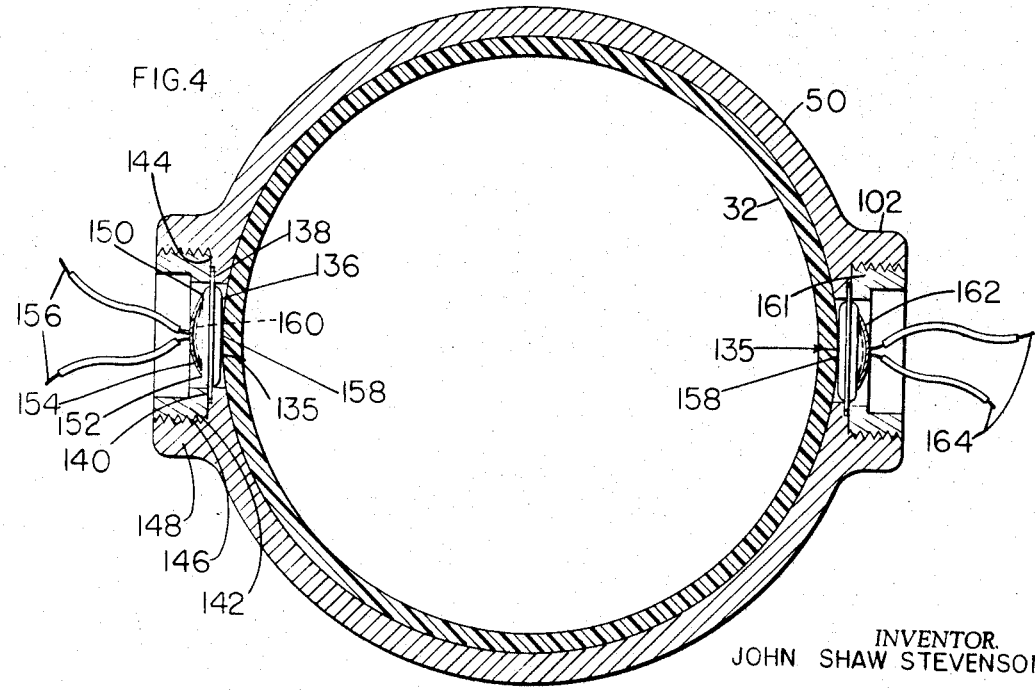
INVENTOR.
JOHN SHAW STEVENSON
BY
*Arthur H. Swanson*
ATTORNEY 3,330,160
MIXTURE DENSITY CONTROL APPARATUS
John Shaw Stevenson, Philadelphia, Pa., assignor to Honeywell Inc., Minneapolis, Minn., a corporation of Delaware
Filed Oct. 30, 1964, Ser. No. 407,816
10 Claims. (Cl. 73—433)

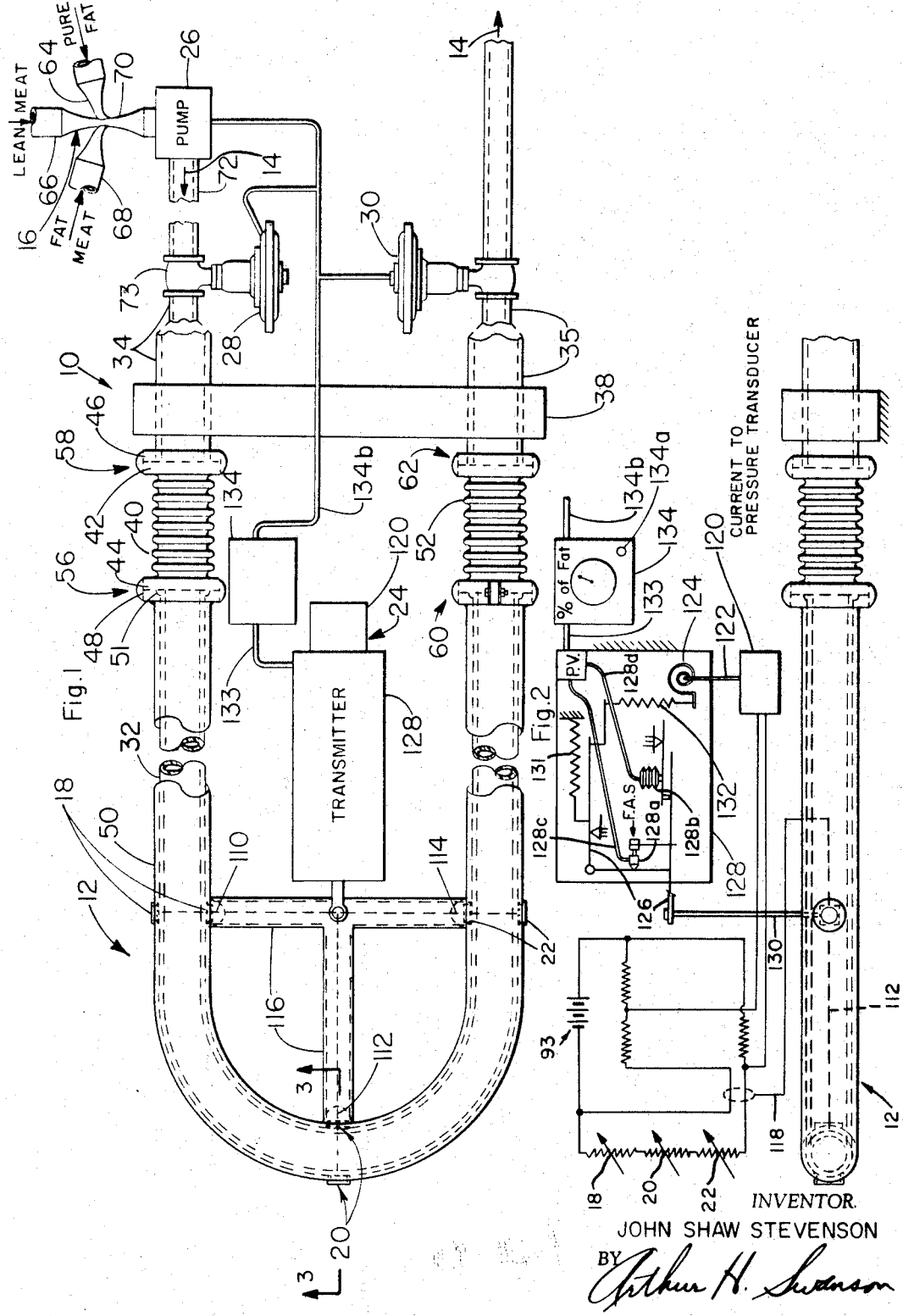

It is an object of the present invention to disclose an apparatus to control the mixing of the ingredients of a mixture and the transporting of a flowing stream of this mixture so that its fat content will be continuously maintained at a desired preselected value.

More specifically, it is another object of the present invention to provide a continuously operated apparatus which will accurately control to a preselected value the fat content of slurried food, such as a fat-meat mix, that is being transported through a metal U-tube weighing unit containing a plastic liner therein.

When fat is dumped into a batch of meat and the meat is then passed through a process flow line, the fat introduced into this meat has heretofore caused large air pockets to form between the fat and other remaining non-fat ingredients of the meat. Fat introduced in this manner into a process flow line also has the tendency to cause some of this air to work its way into the meat as entrained air. When air pockets and entrained air are present in the meat, it is then difficult for a meat processor to maintain a true desired fat–non-fat characteristic of the meat which food laws of our land require him to maintain.

To solve this problem, it is thus one of the objects of the present invention to disclose a multi-inlet, single outlet venturi tube for more uniformly dispersing pure fat into a flowing stream of a fat-meat mix without creating air pockets and entrained air in the flowing stream, thereby retaining the fat-lean meat/fat ratio in a prescribed relationship in which a true weight value of the fat in this stream can be measured in terms of the weight of the mix as it is thereafter pumped through a weighing tube that forms a part of a process flow line.

Prior to the present disclosure, it had been the practice when a chemist desired to take a fat measurement of such a fat mixture, such as a fat slurry, to first take a small sample of the mixture from a batch passing through the process. It had also been the practice to take this mixture sample to his laboratory where he would add chemicals and/or heat to it in order to allow the fat to be poured in liquid form into a calibrated graduate where the volume of the fat in the food sample can be observed.

One of the difficulties with the previously-mentioned, time-consuming, qualitative analysis technique is that the fat content of the entire batch of process food slurry is based on a very small sample which, in a majority of cases, is not a true representative measurement of the fat that is present in the other remaining portion of the batch. Processors of meat mixes cannot, therefore, within any desired close degree of accuracy, rely on this measurement as a means of determining how much additional fat they can legally, under our country's food laws, add to the batch from which the sample was taken.

It is another object of the present invention to provide the previously-mentioned venturi tube together with spaced-apart sensors along the length of the U-shaped weighing tube to sense changes occurring in the compact state of the meat mix passing therethrough along with control instrumentation associated with these sensors which will regulate the size of a passageway through which the meat can flow into and out of the U-tube as well as the pressure under which the ingredients of the mixture are pumped through this passageway and thereby maintain the compact condition of the meat in a desired preselected compacted state throughout the length of the U-tube.

A better understanding of the present invention may be had from the following detailed description, when read in connection with the accompanying drawings in which:

FIG. 1 is the plan view of the aforementioned venturi tube, U-shaped weighing tube and the control apparatus used to maintain the fat content of the flowing stream of a slurry passing therethrough;

FIG. 2 is a side elevation of FIG. 1;

FIG. 3 is a cross-sectional view taken along the line 3—3 of FIG. 1 showing how a strain gage type sensor is mounted on opposite side wall portions of the U-tube and;

FIG. 4 is a modified form of strain gage unit which may be substituted for that shown in FIG. 3.

FIG. 1 discloses a fat controlling apparatus 10 that is comprised of:

A U-shaped weighing tube 12 through which a mixture of a fat slurry and other ingredients is flowing in the direction of the arrows 14, 14;

A multi-inlet, single-outlet venturi unit 16;

Sensor units 18, 20, 22 that are responsive to the changes in the compressed state of the mixture and Control instrumentation 24 that is responsively connected to the sensor units 18–22 to regulate the pressure applied to the mixture by a pump 26 as well as the size of the opening in the reverse-acting valve 28, and direct-acting valve 30 associated with the inlet and outlet passageways 34, 35 of the U-tube weighing unit 12 through which the mixture is flowing.

With the exception of the addition of a liner 32, which is made of a plastic material such as a thermosetting plastic material trade named Mylar, a synthetic elastomer material trade named Viton or Neoprene, a thermo-plastic material e.g. vinyl or a commercially-available material trade named Tygon, or a tetraethylene material trade named Teflon, the U-tube weighing unit 12 is similar to the U-shaped tube unit disclosed in detail in the Robert C. Whitehead, Jr., Patent No. 3,151,575, issued Oct. 6, 1964.

More specifically, this U-tube is comprised of an inlet conduit 34, an outlet conduit 35 and a stationary member 38 supporting these inlet and outlet conduits, a flexible tube 40 having flanged ends 42, 44 extending between the flanged end 46 of the inlet conduit 34 and the flanged ends 48, 51 of the metal or hard plastic U-tube 50 and its liner 32. A similar flexible tube connection 52 is employed, as shown in FIG. 1 between the exit end of the U-tube 50 and its associated outlet conduit 35.

The flanged ends of each of the aforementioned flexible tubes 40, 52 are retained in fluid-tight engagement with their associated U-tube flanges and flanged inlet and outlet parts by means of identical commercially-available sanitary stainless steel fittings 56, 58, 60, 62 which may be of the bolted C-clamp type shown for the fitting 60.

Manufacturers and packers of mixed meats are still confronted with a twofold problem:

(a) How they can best uniformly mix the maximum legal requirement of fat with lean meat, and (b) How they can eliminate air from these compact meat mixes while the mix is being pumped through meat manufacturing process flow conduits.

By placing the multi-inlet-single outlet venturi tube 16 disclosed herein as a flow-through unit in the flow conduit, it is readily apparent that such a fluid slurry collision type venturi tube will provide an ideal way of bursting any entrained air in the fluids as these fluids are combined with one another into the aforementioned meat-fat mixture.

It is also possible with the venturi tube 16 disclosed herein to more uniformly disperse the maximum quantity of fat that is flowing through the venturi inlet branch 64 of the venturi tube with lean meat and/or meat trimmings (fat and meat) flowing through the venturi inlet branches 66, 68 so that a more uniform fat-meat mixture flowing out of the venturi tube outlet branch 70 is obtained.

The multi-inlet–single outlet venturi tube 16 disclosed in FIG. 1 will thus eliminate substantially all entrained air and fat retained in gob form in the meat-fat mixture.

The substantially uniformly combined fat-meat mixture that passes out of the outlet end 70 of the venturi tube 16 can be directed to flow through weight measuring U-tube 12 which, together with the sensors 18, 20, 22 and the control instrumentation 24, will continuously, in an accurate manner, maintain the fat content of the meat mixture.

Although not described in detail, it should be understood that this unique multi-inlet–single outlet venturi tube 16 can also be used to advantage where it is desired to have mixes other than fat slurry mixes, such as chemicals, liquid plastics, etc., thoroughly and uniformly mixed in a prescribed uniform manner.

This multi-inlet–single outlet venturi tube can be used in bringing ores in two or more slurry streams into direct head-on collision with one another so that the undesired size of the ores in these slurries can be considerably reduced.

It should be understood that it is within the scope of the present disclosure to introduce the fat-meat mix, the lean meat and the pure fat into different inlets of the venturi tube than those shown.

It should also be understood that in some applications it may be desirable to introduce more than three fluids or other ingredients into the venturi tube. In such applications, additional venturi tube inlets can be employed at similar but different locations than those shown to accommodate the introduction of these fluids.

The outlet branch 70 of the venturi tube is connected to the inlet port of a pump 26. The pump 26 can be a variable displacement pump such as a Mayo pump. The pump 26 is set to force the meat mixture it receives from the outlet 70 in a desired preselected compressed manner through the pump outlet conduit 72 through the body 73 of valve 28, inlet passageway 34, U-tube 12 and out the outlet passageway 35 through valve 30 and in the direction of the arrow 14 to a meat-stuffing or packing part of the meat process.

Because of the stringent food laws in this country, it has become a vital concern of meat process manufacturers to obtain an apparatus that will accurately measure and control the percentage of fat that is introduced into different types of meat and mixed meats that are being prepared for human consumption.

Experimentation has shown that the weight of a meat-fat mix passing through a flow line cannot be linearly related to the percentage of fat in the mix if the mix is not retained in a uniform compressed state. It is, therefore, necessary to provide instrumentation, of the type to be hereinafter disclosed, that will continuously maintain the mix in the aforementioned uniform compressed state.

It is, therefore, one of the purposes of this disclosure to reveal instrumentation to continuously detect any deviations that occur in the compactness of the meat passing through different portions of the previously-mentioned U-shaped weighing tubes 32, 50 so that the magnitude of the control signal being transmitted by control instrumentation 24 associated with the weighing tubes 32, 50 will be corrected to the magnitude it would normally be at if the fat-lean meat/fat relationship within the tube were in the aforementioned compressed state.

To accomplish the above, the plastic U-shaped tube 32 is provided with a protuberance 78 as shown in FIG. 3.

This protuberance 78 can be made an integral portion of the plastic liner 32 or be secured by a suitable bonding material to the liner 32 as shown in FIG. 3. A bored-out apertured wall portion 80 is shown in FIG. 3 passing through an embossed portion 82 of the metal or hard plastic tube 50. A plug 84 is employed in compressed engagement with the outer surface of the plastic tube 32 and has its outer peripheral surface in threaded engagement at 86 with the wall portion 80.

The plug 84 has a plurality of resilient spring arms, for example 88, 90, integral therewith. These resilient arms 88, 90 are shown compressed against the ends of a bowed, bonded strain gage 92 to retain the central portion of the gage in engagement with the central portion of the protuberance 78.

An increase in the compressed state of the meat-fat mix flowing through the plastic tube 32 will cause a part of this tube to be brought into engagement with the inner end surface 94 of the plug and a central portion of the protuberance 78 to be moved outwardly with the bonded strain gage 92 to force the strain gage to a greater bowed position than that shown in FIG. 3.

The other strain gage 96 shown in FIG. 3 that forms another part of the sensor unit 20 is surrounded by a protuberance 98, wall portion 100, an embossed portion 102, plug 104, resilient arms 106, 108 that are identical to the prevously-described parts 78, 80, 82, 84, 88 and 90 that are employed with strain gage 92.

It should also be noted that the sensor units 18 and 22 each employ strain gage sensing parts that are identical to the parts previously described for sensor unit 20.

The six strain gages 92 in each of the three sensor units 18, 20, 22 are connected in series by suitable conductors 110, 112, 114 passing through a T-shaped member 116 that, in turn, is shown provided with partially recessed end portions fixedly connected by suitable welding material to spaced-apart portions of the metal tube 50.

Each strain gage 92 is also connected to a constant voltage supply unit, 93. As is best seen in FIG. 2, the conductors 110–114 are connected by way of a suitable conductor 118 to a current-to-pressure transducer unit 120. The current-to-pressure transducer unit 120 may be of the type that is disclosed in the E. O. Hall et al., Patent No. 2,927,593, filed Sept. 9, 1957.

The unit 120 is constructed to transmit therefrom, by way of conduit 122, a pressure whose magnitude is varied in a proportional manner with the sum of the output of all the previously-mentioned six strain gages to the interior of a pressure spiral 124.

The spiral 124, in turn, is connected by force spring 132 to apply a force proportional to the compressed state of the slurry mix in different parts of the U-tube as an input force to the force balance beam structure 126 of the transmitter 128 having a nozzle 128a that has a Filtered Air Supply (F.A.S.) and a feedback bellows 128b connected by their respective conduits 128c, 128d with a Pilot Valve (P.V.).

This transmitter 128 may be of the same type as that disclosed in the previously-mentioned Robert C. Whitehead, Jr., Patent No. 3,151,775 issued Oct. 6, 1964. This force balance transmitter 128 is constructed to have applied thereto an input force proportional to the weight of the meat-fat ingredients passing therethrough by way of a flexible connection 130. As the weight of the meat-fat ingredients is increased beyond a preselected fixed weight of the U-tube and the mix therein, which is prevented from being applied to the beam by the force of a suppression spring 131, an output control signal of decreasing magnitude will be produced by the transmitter 128.

No change will occur in the fluid pressure output signal being simultaneously transmitted by way of conduit 134b to the pumping unit 26 and the underhead side of the reverse-acting valve 28 and the topside of the direct-acting valve in the inlet and outlet passageways 34, 35, under a condition in which the meat in the plastic U-tube 32 is in a desired compressed state without bubbles or entrained air therein and the weight of the meat-fat mix bears a direct relation to the percentage of fat in the type of meat being processed.

When any undesired air bubbles or entrained air are detected by any one or all of the sensor units 18, 20, 22 the force which the current-to-pressure unit 120 will then apply to the force balance beam structure 126 of the transmitter 128 will be changed in magnitude to a value that will depend on the quantity of air bubbles and entrained air that is at that time present in the U-shaped weighing tube 32.

This will be so because bubbles and entrained air in the fat-meat mixture will not provide as great a compressive force to retain the bonded strain gage in as great a bowed condition as that which is present when the bubbles are not present in the meat-fat mix.

As the value of the force is applied to the force balance beam structure 126 by the resilient connection 130, the pressure in the pressure spiral 124 is decreased and the force spring 132 which is made of selected sizes, to rebalance the weight of the change in the weight of the mix, is reduced. The output signal that is then transmitted by way of the nozzle 128a, conduit 128c, the pilot valve (P.V.) and conduit 133 to the recording controller 134 will be decreased. The recording controller having a set point adjusting knob 134a will, in turn, simultaneously transmit by way of conduit 134b a decreasing pressure signal to the pumping unit 26 and the underhead side of the reverse-acting valve 28 and the top of the direct-acting valve 30. Under this conduit, the speed at which the pumping unit 26 will then be operated will be increased to a speed that is proportional to the decrease that has taken place in the magnitude of the output signal. This condition will cause the valve 28 to be moved to a more widely-opened position while the valve 30 will be moved to a more narrowly-closed position.

The motion of the valves will be, therefore, proportionately commensurate with the change that has occurred in the output signal that it receives.

FIG. 4 of the drawing discloses a sensor unit 135 that can be employed with the control instrumentation 24 and 134 in lieu of each of the previously-mentioned strain gage units 18–22. This sensor unit 135 is comprised of a diaphragm capsule 136 that is filled with a commercially-available fluid whose volume is unaffected by changes in ambient temperature. The fluid-tight capsule 136 is shown having an outer peripheral ring 138 held in place by the inner end 140 of a plug 142 against the hard outer conduit wall 144. The plug 142 is threadedly mounted at 146 to a threaded wall portion of the embossed portion 148. The inner right end surface of the capsule diaphragm 136 is shown in a compressed state with the outer surface of the compressible wall 32. The left side of the diaphragm capsule 136 is shown having the ends of the upper and lower parts 150, 152 of a bowed-shaped strain gage 154 fixedly connected by a braising material or a seam weld.

An increase in the compressed state of the meat-fat mix flowing through the plastic tube 32 will cause a part of this tube to be brought into contact with the inner end surface 158 of the fluid-filled diaphragm capsule to compress same. This action, in turn, will cause the fluid within the capsule to apply pressure to the left surface 160 of the capsule and cause it to be moved to the left to, e.g., one of many different represented positions as shown in dotted line form in FIG. 4. This action will cause the bonded strain gage 154 to be moved to the one of many different represented bowed positions, as shown in dotted line form in FIG. 4.

FIG. 4 also shows suitable leads 156 similar to the leads 112 previously described. The other capsule 158, plug 161 and strain gage 162 and leads 164 shown in FIG. 4 are identical to these same parts that have just been described under the description of FIG. 3.

It can thus be seen from the aforementioned description that an apparatus has been disclosed that will control the mixing of the ingredients of a mixture and the transporting of a fluid stream of the mixture so that its percent of fat content will continuously be maintained at a desired preselected level.

What is claimed is:

1. An apparatus for automatically controlling the percent of fat in a flowing fat-lean meat mixture to a preselected value, comprising a tube, a deformable liner positioned to extend throughout the length of the tube and adapted to pass the fat-lean meat mixture in a compressed state therethrough, a weighing means, one portion of the tube being mounted on the weighing means to generate a pressure signal that is proportional to the weight of the fat passing through the liner when the mixture is in a preselected compressed state, a pressure responsive means operably connected to the liner for movement by changes occurring in the pressure of the mixture acting on the wall of the liner and responsive to any other pressure change that occurs in the compressed state of the mixture from a preselected fat-meat ratio weight value, said pressure responsive means being operably connected with the weighing means to apply a force thereto at another portion thereof that is proportional to the magnitude of the pressure change occurring in the mixture, and an adjustable restricting means positioned at spaced-apart portions of the tube, said restricting means being operably responsive to changes occurring in the pressure signal generated by the weighing means to effect an increase in the flow of the mixture passing through one of the restricting means while effecting a decrease in the flow rate of the mixture passing through the other restricting means, a pressure gage responsive to changes occurring in the magnitude of the pressure signal generated by the weighing means to continuously indicate the percentage of fat in the fat-lean meat mixture passing through the tube.

2. The apparatus for automatically controlling the percent of fat in a flowing fat-lean meat mixture to a preselected value as defined by claim 1, wherein the pressure responsive means is a fluid-filled capsule, an adjustable means mounted in a wall portion of the tube is employed to retain an inner side wall of the capsule in compressed movable contact with the liner, the ends of a strain gage of a bowed-shaped configuration are mounted on the outer side walls of the capsule and said operable connection between the pressure responsive means and the weighing means being comprised of a current-to-pressure transducer connected to the pressure responsive means to apply the force to the weighing means that is proportional to the magnitude of the pressure change occurring in the mixture.

3. The apparatus for automatically controlling the percent of the fat in a flowing fat-lean meat mixture to a preselected value as defined by claim 1, wherein the deformable liner has a protuberance extending in an outward direction from its outer wall, a strain gage is employed as the pressure responsive member and an adjustable spring biasing means mounted in the wall portion of the tube is employed to retain the ends of the strain gage in an adjustably-fixed position and the remaining portion thereof in a bowed physical surface-to-surface compressed engagement with the protuberance.

4. The apparatus for automatically controlling the percent of fat in a flowing fat-lean meat mixture to a preselected value as defined by claim 1, wherein the pressure responsive means is a plurality of fluid-filled capsules, an adjustable means mounted in a spaced-apart wall portion of the tube is employed to retain an inner side wall of the capsule in compressed movable contact with associated portions of the liner, the ends of a strain gage of a bowed-shaped configuration are mounted on each of the outer side wall portions of the capsule and wherein a current-to-pressure transducer is operably connected to each of the pressure responsive means in series to apply the force to the weighing means that is proportional to the magnitude of the pressure change occurring in the mixture.

5. The apparatus for automatically controlling the percentage of fat in a flowing fat-lean meat mixture as defined in claim 1, comprising a pump having a discharge end connected to an inlet end of the tube, a venturi tube, one part of the venturi tube having a throat portion and a single outlet branch connected to the inlet side of the pump, and the other part of the venturi tube having separate throat portions to accommodate the flow of separate streams of lean meat, pure fat and fat-meat mixes into the first part of the venturi pump and tube.

6. An apparatus for automatically controlling the percent of fat in a flowing fat-lean meat mixture to a preselected value, comprising a deformable tube adapted to pass the fat-lean meat mixture in a compressed state therethrough, a weighing means, one portion of the tube being mounted on the weighing means to generate a pressure signal that is proportional to the weight of the fat passing through the tube when the mixture is in a preselected compressed state, a pressure responsive means operably connected to the liner for movement by changes occurring in the pressure of the mixture acting on the wall of the deformable tube and responsive to any other pressure change that occurs in the compressed state of the mixture from a preselected fat-meat ratio weight value, said pressure responsive means being operably connected with the weighing means to apply a force thereto at another portion thereof that is proportional to the magnitude of the pressure change occurring in the mixture, and an adjustable restricting means associated with the tube operably responsive to changes occurring in the pressure signal generated by the weighing means to effect a change in the flow of the mixture passing through the restricting means.

7. The apparatus to maintain the control of the percentage of fat in a flowing mixture as defined in claim 6, wherein an adjustable pumping unit is employed to supply the mixture under pressure to the weighing tube, the weighing means is operably connected to the pumping unit to transmit the control signal thereto to regulate the pressure under which the mixture is forced through the weighing tube to a value that will maintain the percent of fat in the mixture at a substantially fixed value.

8. The apparatus for automatically maintaining the control of the percent of fat as defined in claim 6, wherein an adjustable pumping unit is employed to supply the mixture under pressure to the deformable tube, and means for transmitting the pressure signal generated by the weighing means to the pumping unit to regulate the pressure under which the mixture is forced through the deformable tube to a value that will maintain the percent of fat in the mixture at a substantially fixed value.

9. An apparatus to maintain the percentage of fat in a flowing fluid mixture containing fat and at least one other ingredient under a varying pressure that is greater than atmospheric pressure at a preselected value as said fluid mixture flows through a flexibly-mounted deformable weighing tube that is open to atmospheric pressure, comprising a controller, a force balance transmitting means, a force-transmitting member extending between said force balance transmitting means and a portion of the weighing tube where the center of gravity of the tube and the center of gravity of the fluid in the tube are coincident to thereby transmit the weight of the tube and its contents in the form of an input force to said force balance transmitting means, said transmitting means being operably connected to transmit a force signal of increasing magnitude to the controller as the weight of the tube and the fluid mixture passing therethrough exceeds a preselected weight and to transmit a force signal of decreasing magnitude to said controller as the weight of the tube and fluid mixture passing therethrough is reduced below the preselected weight, pressure responsive means operably connected to the deformable tube for movement with the wall of the deformable tube and responsive to any pressure changes that occur in the compressed state of the mixture from a preselected fat-other ingredient ratio weight value, said pressure responsive means being operably connected with the transmitting means to modify the magnitude of the signal it transmits to the controller in accordance with said pressure changes, a reverse acting control valve for controlling the flow of the fluid mixture as it flows into and out of the weighing tube, a direct acting control valve for controlling the flow of the fluid mixture as it flows out of the weighing tube, the controller being operably connected to transmit a control signal to said control valves whose magnitude is equal to the difference in magnitude of the signal it receives from said transmitter and an adjustably fixed density set point signal to maintain the fluid mixture flowing through and out of the weighing tube in a prescribed compressed state and thereby maintain the percent of fat therein at a substantially fixed value.

10. An apparatus to maintain the percentage of fat in a flowing fluid mixture containing fat and at least one other ingredient under a varying pressure that is greater than atmospheric pressure at a preselected value as said fluid mixture flows through a flexibly-mounted deformable weighing tube that is open to atmospheric pressure, comprising a controller, a force balance transmitting means, a force-transmitting member extending between said force balance transmitting means and a portion of the weighing tube, said transmitting means being operably connected to transmit a force signal of increasing magnitude to the controller as the weight of the tube and the fluid mixture passing therethrough exceeds a preselected weight and to transmit a force signal of decreasing magnitude to said controller as the weight of the tube and fluid mixture passing therethrough is reduced below the preselected weight, pressure responsive means operably connected to the deformable tube for movement with the wall of the deformable tube and responsive to any pressure changes that occur in the compressed state of the mixture from a preselected fat-other ingredient ratio weight value, said pressure responsive means being operably connected with the transmitting means to modify the magnitude of the signal it transmits to the controller in accordance with said pressure changes, a reverse acting control valve for controlling the flow of the fluid mixture as it flows into and out of the weighing tube, a direct acting control valve for controlling the flow of the fluid mixture as it flows out of the weighing tube, the controller being operably connected to transmit a control signal to said control valves whose magnitude is equal to the difference in magnitude of the signal it receives from said transmitter and an adjustably fixed density set point signal to maintain the fluid mixture flowing through and out of the weighing tube in a prescribed compressed state and thereby maintain the percent of fat therein at a substantially fixed value.

References Cited

UNITED STATES PATENTS

| | | | |
|---|---|---|---|
| 1,112,641 | 10/1914 | Moeller. | |
| 2,998,722 | 9/1961 | Jaquith | 177—16 X |
| 2,999,270 | 9/1961 | Knapp | 17—35 |
| 3,050,771 | 8/1962 | Mylchreest | 17—41 |
| 3,151,775 | 10/1964 | Whitehead | 73—434 X |
| 3,282,115 | 11/1966 | Taylor et al. | 177—245 X |

RICHARD B. WILKINSON, *Primary Examiner.*

GEORGE H. MILLER, Jr., *Assistant Examiner.*